United States Patent
Kurasawa (10) Patent No.: US 6,909,488 B2
(45) Date of Patent: Jun. 21, 2005

(54) ELECTRONIC DEVICE, METHOD OF MANUFACTURING THE SAME, AND ELECTRONIC INSTRUMENT

(75) Inventor: Munenori Kurasawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 83 days.

(21) Appl. No.: 10/359,587

(22) Filed: Feb. 7, 2003

(65) Prior Publication Data

US 2003/0160929 A1 Aug. 28, 2003

(30) Foreign Application Priority Data

Feb. 28, 2002 (JP) .......................... 2002-054138

(51) Int. Cl.$^7$ .......................... G02F 1/1345; G09F 9/00
(52) U.S. Cl. .......................... 349/187; 349/150; 349/152
(58) Field of Search .......................... 349/149, 150, 349/151, 152, 187; 445/24, 25; 361/777, 789; 257/81, 777, 778

(56) References Cited

U.S. PATENT DOCUMENTS 6,411,359 B1 * 6/2002 Kobayashi et al. ......... 349/149

2002/0012096 A1 * 1/2002 Uchiyama ................. 349/187
2003/0022558 A1  1/2003 Imaoka ..................... 439/660

FOREIGN PATENT DOCUMENTS

| JP | A 3-200223 | 9/1991 |
| JP | B2 2937931 | 6/1999 |
| JP | B2 3067038 | 5/2000 |

OTHER PUBLICATIONS

Co–Pending U.S. Appl. No. 10/201,777, filed Jul. 25, 2002.

* cited by examiner

Primary Examiner—Toan Ton
Assistant Examiner—Tai Duong
(74) Attorney, Agent, or Firm—Oliff & Berridge, PLC (57) ABSTRACT

The first and second electronic components are disposed so that a first X axis and a second X axis coincide with each other and a first Y axis and a second Y axis coincide with each other. The first and second electronic components are moved in directions, in which a first point and a second point approach each other, and along the first and second Y axes by an approximated distance between the first and second points.

18 Claims, 6 Drawing Sheets

FIG. 2B $W' \doteqdot W \doteqdot W_1$
$D' \doteqdot D$
$W'' \doteqdot W_2$

FIG. 3A

FIG. 3B $$\Delta Y = (D'/W') \times (W'' - W')$$
$$\fallingdotseq (D/W) \times (W_2 - W_1) = (D/W) \times (\Delta W_1 + \Delta W_2)$$

$$\Delta W : (W'' - W') \text{ or } (W_2 - W_1) = (\Delta W_1 + \Delta W_2)$$

ELECTRONIC DEVICE, METHOD OF MANUFACTURING THE SAME, AND ELECTRONIC INSTRUMENT

Japanese Patent Application No. 2002-54138, filed on Feb. 28, 2002, is hereby incorporated by reference in its entirety.

BACKGROUND OF THE INVENTION

The present invention relates to an electronic device and a method of manufacturing the same and an electronic instrument.

Conventionally, there has been a problem that when connecting many electrodes, such as Chip On Film (COF) mounting, in which a flexible printed circuit board is connected to a liquid crystal panel, the occurrence of mispositioning makes it impossible to provide electrical conductivity between the electrodes. Specifically, it has been difficult to avoid the mispositioning of the electrodes in the case of the electrodes formed on a thin resin film, such as a flexible printed circuit board, because resin films are prone to expand and contract with heat and dampness.

BRIEF SUMMARY OF THE INVENTION

A method of manufacturing an electronic device according to an aspect of the present invention includes step of positioning a first group of terminals including three or more terminals formed in a first electronic component and a second group of terminals including three or more terminals formed in a second electronic component so as to overlap each other and electrically connecting the first and second groups of terminals, wherein the first electronic component has a pair of first marks, wherein the second electronic component has a pair of second marks, wherein (a) in a design stage:

each of terminals in the first group of terminals is designed to extend along one of a plurality of first lines passing through a first point;

terminals in the first group of terminals are arranged line symmetrically with respect to a first Y axis passing through the first point;

each of terminals in the second group of terminals is designed to extend along one of a plurality of second lines passing through a second point;

terminals in the second group of terminals are arranged line symmetrically with respect to a second Y axis passing through the second point;

the first lines and the second lines are designed to be arranged in the same manner;

the pair of first marks are designed to be located on a first X axis which is orthogonal to the first Y axis and intersects with the first group of terminals;

the pair of second marks are designed to be located on a second X axis which is orthogonal to the second Y axis and intersects with the second group of terminals; and the pair of first marks are designed to coincide with the pair of second marks, respectively, when the first and second groups of terminals overlap each other, and wherein (b) the step of positioning the first and second groups of terminals comprises steps of:

disposing the first and second electronic components so that the first and second X axes coincide with each other and the first and second Y axes coincide with each other; and moving the first and second electronic components respectively, in directions in which the first and second points approach each other and along the first and second Y axes, by an approximated distance between the first and second points.

An electronic device according to another aspect of the present invention is manufactured by the above method.

An electronic instrument according to a further aspect of the present invention has the above electronic device.

DETAILED DESCRIPTION OF THE EMBODIMENTS

The present invention may provide an electronic device in which electrical conductivity can be achieved reliably, a method of manufacturing the same, and an electronic instrument.

(1) A method of manufacturing an electronic device according to an embodiment of the present invention includes step of positioning a first group of terminals including three or more terminals formed in a first electronic component and a second group of terminals including three or more terminals formed in a second electronic component so as to overlap each other and electrically connecting the first and second groups of terminals, wherein the first electronic component has a pair of first marks, wherein the second electronic component has a pair of second marks, wherein (a) in a design stage:

each of terminals in the first group of terminals is designed to extend along one of a plurality of first lines passing through a first point;

terminals in the first group of terminals are arranged line symmetrically with respect to a first Y axis passing through the first point;

each of terminals in the second group of terminals is designed to extend along one of a plurality of second lines passing through a second point;

terminals in the second group of terminals are arranged line symmetrically with respect to a second Y axis passing through the second point;

the first lines and the second lines are designed to be arranged in the same manner;

the pair of first marks are designed to be located on a first X axis which is orthogonal to the first Y axis and intersects with the first group of terminals;

the pair of second marks are designed to be located on a second X axis which is orthogonal to the second Y axis and intersects with the second group of terminals; and the pair of first marks are designed to coincide with the pair of second marks, respectively, when the first and second groups of terminals overlap each other, and wherein (b) the step of positioning the first and second groups of terminals comprises steps of:

disposing the first and second electronic components so that the first and second X axes coincide with each other and the first and second Y axes coincide with each other; and moving the first and second electronic components respectively, in directions in which the first and second points approach each other and along the first and second Y axes, by an approximated distance between the first and second points.

According to this embodiment of the present invention, even when expansion or contraction of the first or second electronic component makes it impossible to conduct the positioning of the first and second groups of terminals in accordance with the design thereof, they can be positioned through simple operations using the first and second marks.

(2) In this method of manufacturing an electronic device, the pair of first marks may be disposed at positions line symmetrical with respect to the first Y axis, the pair of second marks may be disposed at positions line symmetrical with respect to the second Y axis, and the step of disposing the first and second electronic components so that the first and second Y axes coincide with each other may include moving the first and second electronic components so that a first distance and a second distance become equal to each other, the first distance being a distance between one of the first marks and one of the second marks overlapping each other in a design, and the second distance being a distance between the other of the first marks and the other of the second marks overlapping in a design.

(3) In this method of manufacturing an electronic device, the step of disposing the first and second electronic components so that the first and second Y axes coincide with each other may include:

measuring the first distance $\Delta W_1$;

measuring the second distance $\Delta W_2$; and moving the first and second electronic components so that the first and second distances $\Delta W_1$ and $\Delta W_2$ become:

$$(\Delta W_1 + \Delta W_2)/2.$$

(4) This method of manufacturing an electronic device may further include:

obtaining a ratio D/W of a distance D prior to the step of positioning the first and second groups of terminals, the distance D being a distance between an intersecting point of the first X and Y axes in a design and the first point with respect to a distance W between a pair of terminals disposed line symmetrically among the first group of terminals in a design, the distance W may also be a distance between a pair of terminals disposed line symmetrical among the second group of terminals in a design, the ratio D/W may also be a ratio of a distance D between an intersecting point of the second X and Y axes in a design and the second point to the distance W, a difference $\Delta W$ between a distance W' or a distance $W_1$, and a distance W'' or a distance $W_2$ may be computed, the distance W' being a distance at a time of positioning the pair of terminals selected among the first group of terminals and used as a reference for the distance W, the distance $W_1$ being an approximate value of the distance W', the distance W'' being a distance at a time of positioning the pair of terminals selected among the second group of terminals and used as a reference for the distance W, and the distance $W_2$ being an approximate value of the distance W'', and an approximated distance $\Delta Y$ between the first and second points may be computed by using the following equation:

$$\Delta Y = (D/W) \times \Delta W.$$

(5) In this method of manufacturing an electronic device, the difference $\Delta W$ to be computed may be a difference between the distance $W_1$ and the distance $W_2$, the distance $W_1$ may be a distance between the pair of first marks, and the distance $W_2$ may be a distance between the pair of second marks.

(6) In this method of manufacturing an electronic device, the difference $\Delta W$ may be computed by using the following equation:

$$\Delta W = \Delta W_1 + \Delta W_2.$$

(7) In this method of manufacturing an electronic device, the pair of first marks may be disposed at positions closer to the pair of terminals, which are selected among the first group of terminals as a reference for the distance W, than the remaining terminals, and the pair of second marks may be disposed at positions closer to the pair of terminals, which are selected among the second group of terminals as a reference for the distance W, than the remaining terminals.

(8) In this method of manufacturing an electronic device, the pair of first marks may be disposed in an end portion of the first electronic component, and the pair of second marks may be disposed in an end portion of the second electronic component.

(9) In this method of manufacturing an electronic device, the difference $\Delta W$ to be computed may be a difference between the distance W' and the distance W'', each of the pair of first marks may be a part of each of the pair of terminals selected among the first group of terminals and used as a reference for the distance W, and each of the pair of second marks may be a part of each of the pair of terminals selected among the second group of terminals and used as a reference for the distance W.

(10) In this method of manufacturing an electronic device, a pair of terminals selected among the first group of terminals and located at opposed ends along an arrangement direction of the first group of terminals may be used as a reference for the distance W, and a pair of terminals selected among the second group of terminals and located at opposed ends along an arrangement direction of the second group of terminals may be used as a reference for the distance W.

(11) In this method of manufacturing an electronic device, the distance W in a design of the first group of terminals may be substantially equal to the distance W' at a time of positioning, and the distance D between the intersecting point of the first X and Y axes and the first point of the first group of terminals in a design may be substantially equal to a distance D' between an intersecting point of the first X and Y axes and the first point at a time of positioning, and following relations may be considered to compute the difference ΔW:

W'=W, and

D'=D.

(12) In this method of manufacturing an electronic device, the approximated distance ΔY between the first and second points may be previously obtained prior to the step of positioning the first and second groups of terminals, and the approximated distance ΔY between the first and second points may be read out and used in the step of positioning the first and second groups of terminals.

(13) In this method of manufacturing an electronic device, the first marks may be formed of the same material as the first group of terminals, and the second marks may be formed of the same material as the second group of terminals.

(14) In this method of manufacturing an electronic device, positioning of the first and second electronic components may be conducted by an automatic control.

(15) In this method of manufacturing an electronic device, the automatic control may be performed by image recognition by a camera and calculation by a computer.

(16) An electronic device according to another embodiment of the present invention is manufactured by the above-described method.

(17) An electronic instrument according to a further embodiment of the present invention has the above-described electronic device.

Referring now to drawings, embodiments of the present invention are described below.

First Embodiment

FIGS. 1A to 4B illustrate a method of manufacturing an electronic device according to a first embodiment of the present invention.

Design Stage

Figure 1A:
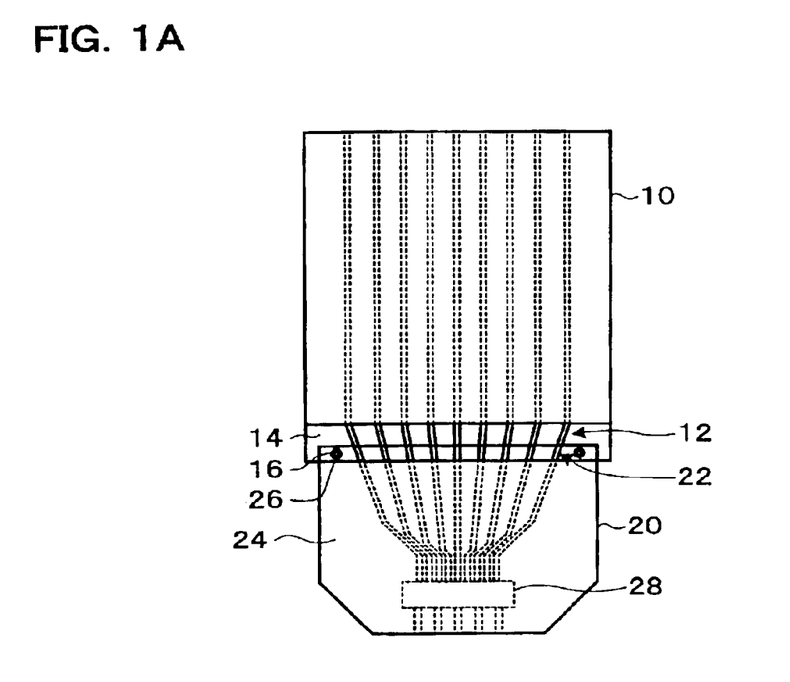
FIGS. 1A and 1B illustrate a method of manufacturing an electronic device according to a first embodiment of the present invention.

FIG. 1A shows an electronic device in a design stage. The electronic device has a plurality of electronic components (first and second electronic components 10 and 20). The first electronic component 10 illustrated in FIG. 1A is an electro-optic panel, such as a liquid crystal panel and an electroluminescence panel. The first electronic component 10 has a first group of terminals 12. The first group of terminals 12 are formed on the substrate 14 of the first electronic component 10, e.g. a glass substrate. The first group of terminals 12 is composed of at least three terminals, and it may be a part of metallization pattern. The first electronic component 10 has a pair of first marks 16. The first marks 16 may be formed of the same material as that of the first group of terminals 12, or may be through-holes or concave portions formed on the substrate 14.

The second electronic component 20 shown in FIG. 1A may be a semiconductor device to which Chip On Film (COF) mounting or Tape Carrier Package (TCP) technique is applied, for example. The second electronic component 20 may have an integrated circuit 28 (e.g. a semiconductor chip). The integrated circuit 28 is intended to control the first electronic component 10. The second electronic component 20 has a second group of terminals 22. The second group of terminals 22 are formed on the substrate 24 of the second electronic component 20, e.g. a flexible substrate formed of resin. In FIG. 1A, the second group of terminals 22 are formed on the backside of the substrate 24. The second group of terminals 22 is composed of at least three terminals, and it may be a part of metallization pattern. The second electronic component 20 has a pair of second marks 26. The second marks 26 may be formed of the same material as that of the second group of terminals 22, or may be through-holes or concave portions formed on the substrate 24. The first and second marks 16 and 26 may be of ring shape, square-ring shape, circular shape, or x-shape, respectively.

Figure 1B:
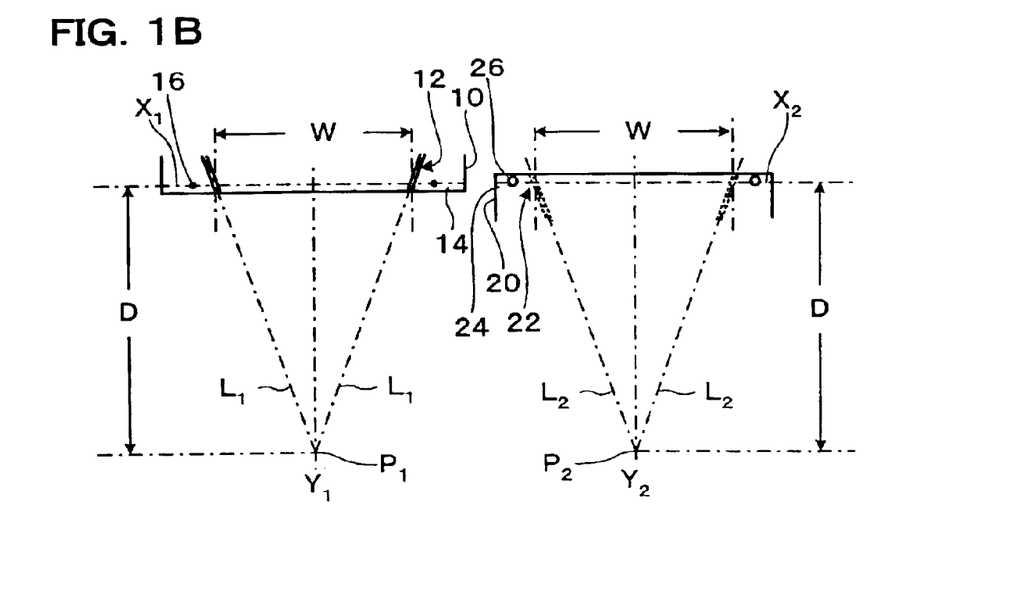

FIG. 1B illustrates the design of the first and second groups of terminals. The individual first group of terminals 12 are designed to extend along any one of first lines $L_1$ passing through a first point $P_1$. In addition, the first group of terminals 12 are designed to be arranged symmetrically with respect to a first Y axis $Y_1$ passing through the first point $P_1$. The individual second group of terminals 22 are designed to extend along any one of second lines $L_2$ passing through a second point $P_2$. Also, the second group of terminals 22 are designed to be arranged symmetrically with respect to a second Y axis $Y_2$ passing through the second point $P_2$. Besides, the alignments of the first lines $L_1$ and the second lines $L_2$ are designed to be identical.

The pair of first marks 16 are designed to be located on a first X axis $X_1$. The first X axis $X_1$ is orthogonal to the first Y axis $Y_1$ and intersects the first group of terminals 12. The pair of first marks 16 are disposed at positions having line symmetry with respect to the first Y axis $Y_1$. Also, the pair of first marks 16 are disposed in an end portion of the first electronic component 10 (the substrate 14), for example, outwardly of all the first group of terminals 12.

The pair of second marks 26 are designed to be located on a second X axis $X_2$. The second X axis $X_2$ is orthogonal to the second Y axis $Y_2$ and intersects the second group of terminals 22. The pair of second marks 26 are disposed at positions having line symmetry with respect to the second Y axis $Y_2$. Also, the pair of second marks 26 are disposed in an end portion of the second electronic component 20 (the substrate 24), for example, outwardly of all the second group of terminals 22.

As shown in FIG. 1A, the first and second marks 16 and 26 are designed so that each of the first marks 16 coincides with one of the second marks 26 when the first and second groups of terminals 12 and 22 in a design overlap. A distance W between a pair of terminals at positions having line symmetry selected among the first group of terminals 12 in a design, is identical to a distance between a pair of terminals at positions having line symmetry of the second group of terminals 22 in a design. Among the first group of terminals 12, one pair of terminals located in both the ends of the arrangement of the terminals 12 in the direction of the arrangement thereof may be used as a reference terminal pair for the distance W. Further, among the second group of terminals 22, one pair of terminals located in both the ends of the arrangement of the terminals 22 in the direction of the arrangement thereof may be used as a reference terminal pair for the distance W. A distance D between the intersecting point of the first X and Y axes $X_1$ and $Y_1$ and the first point of $P_1$ in a design is also identical to a distance between the intersecting point of the second X- and Y- axes $X_2$ and $Y_2$ and the second point of $P_2$ in a design.

The pair of first marks 16 are disposed at the positions closer to the pair of terminals, which are selected among the first group of terminals 12 and used as a reference terminal pair for the distance W, in comparison with the remaining terminals. Likewise, the pair of second marks 26 are disposed at the positions closer to the pair of terminals, which are selected among the second group of terminals 22 and used as a reference terminal pair for the distance W, in comparison with the remaining terminals.

A Stage Between Design and Positioning Stages

As shown in FIG. 1A, in design stage, if the first marks 16 and the second marks 26 are positioned, the first group of terminals 12 coincide with the second group of terminals 22. In the actual positioning stage, however, there is a case where a member for supporting the first group of terminals 12 (e.g. a substrate 14) and a member for supporting the second group of terminals 22 (e.g. a substrate 24) expand and contract with different ratios. The reasons for this are differences in coefficient of thermal expansion and hygroscopicity between the substrates 14 and 24. Expansion or contraction of the substrates 14 and 24 with different ratios causes displacement in the first and second groups of terminals 12 and 22 (See FIG. 3A).

Figure 2A:
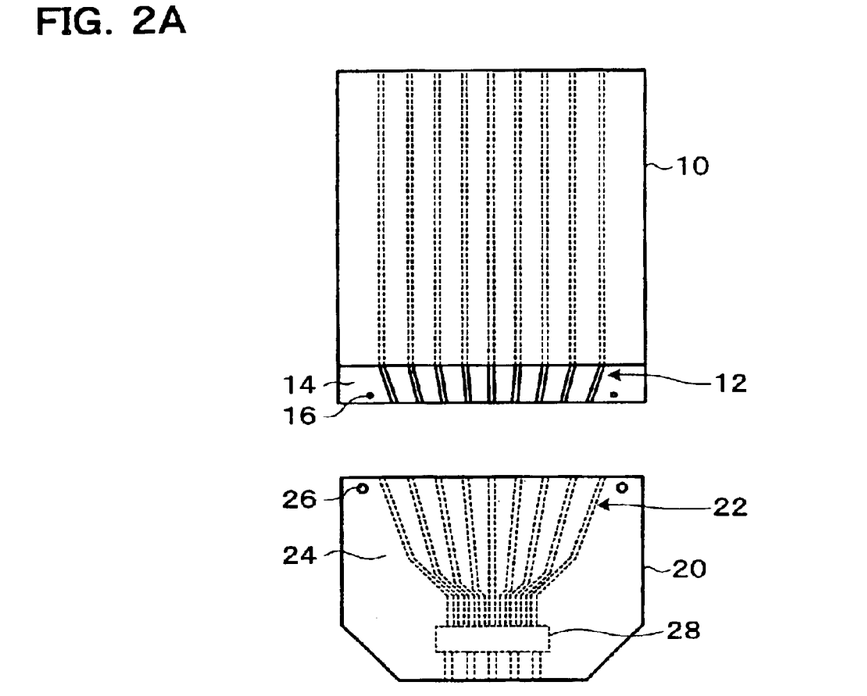
FIGS. 2A and 2B illustrate the method of manufacturing an electronic device according to the first embodiment of the present invention.
Figure 2B:
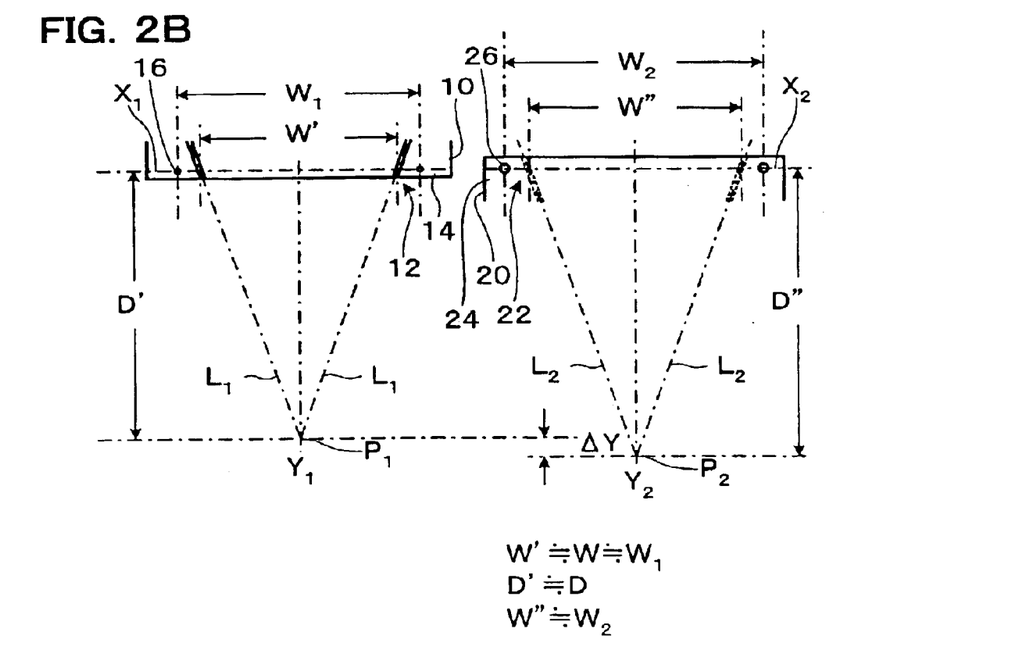

FIGS. 2A and 2B illustrate the first and second groups of terminals when the mispositioning occurs between the terminal groups. For example, as for the first electronic component 10, the distance W in the design stage is replaced with a distance W' in the positioning stage; the distance D in the design stage is replaced with a distance D' in the positioning stage. In addition, as for the second electronic component 20, the distance W in the design stage is replaced with a distance W" in the positioning stage; the distance D in the design stage is replaced with a distance D" in the positioning stage.

In this embodiment, the member (substrate 14) for supporting the first group of terminals 12 in the first electronic component 10 is formed of a material (e.g. glass) unsusceptible to deformation due to heat and dampness, etc. Accordingly, the distances W and W' are substantially equal, and the distances D and D' are also substantially equal, whereby it can be considered that there are following relations:

W'=W, and

D'=D.

In contrast, the member (substrate 24) for supporting the second group of terminals 22 in the second electronic component 20 is formed of a material (e.g. polyimide resin) susceptible to deformation due to heat and dampness, etc., in comparison with the substrate 14. Therefore, the distances W and W" are not equal, and also the distances D and D" are not equal, so that following relations can be considered:

W"≠W, and

D"≠D.

The first and second marks 16 and 26 are formed at the positions close to the first and second groups of terminals 12 and 22, respectively. Then, the distance $W_1$ between the pair of first marks 16 is used as an approximated distance of the distance W'; the distance $W_2$ between the pair of second marks 26 is used as an approximated distance of the distance W". In other words, it can be considered that there are following relations:

W'=$W_1$, and

W"=$W_2$.

In this embodiment, an approximated distance $W_1$ is used as the distance W', and an approximated distance $W_2$ is used as the distance W". Further, a ratio D/W of the distance D to the distance W, is obtained before positioning (See FIG. 1B).

Positioning Stage

Figure 3A:
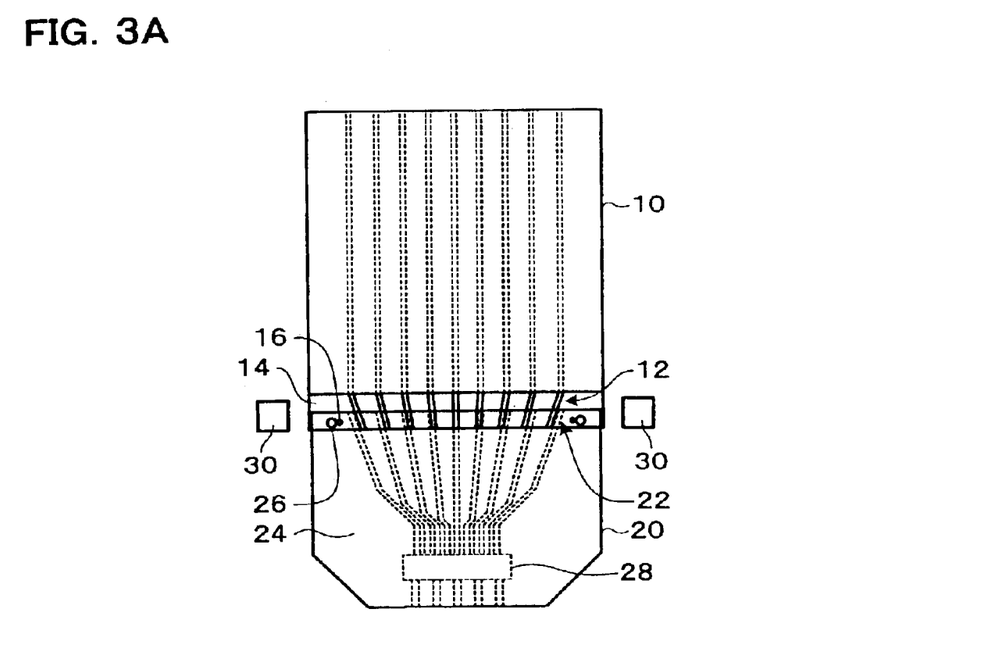
FIGS. 3A and 3B illustrate the method of manufacturing an electronic device according to the first embodiment of the present invention.
Figure 3B:
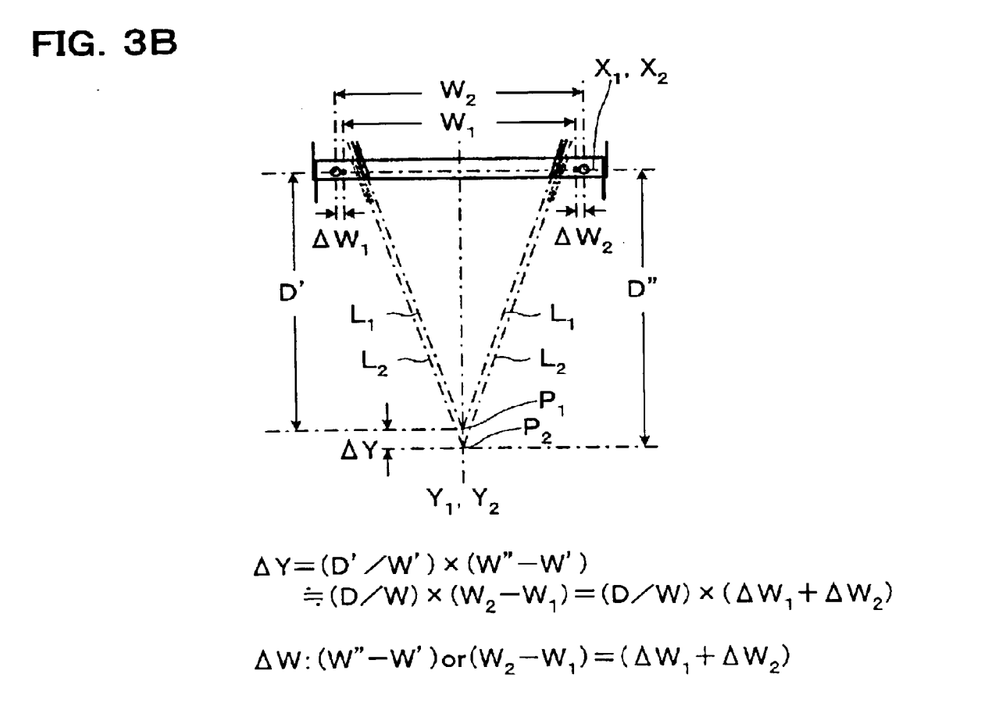

As shown in FIGS. 3A and 3B, the first and second electronic components 10 and 20 are so disposed that the first and second X axes $X_1$ and $X_2$ coincide. For example, in the X and Y standard coordinates of an positioning apparatus (manufacturing equipment), when the first and second marks 16 and 26 are disposed on the X axis thereof, the first X axis $X_1$ coincides with the second X axis $X_2$. In the case of conducting positioning under automatic control, images of the first and second marks 16 and 26 are picked up by at least one camera 30 (e.g. a pair of cameras) to recognize the images, and then amounts and directions of movement of the first and second electronic components 10 and 20 are calculated by a computer.

In addition, the first and second electronic components 10 and 20 are so disposed that the first and second Y axes $Y_1$ and $Y_2$ coincide. More specifically, the first and second electronic components 10 and 20 are so moved that a first distance $\Delta W_1$ between one of the first marks 16 and one of the second marks 26, which overlap with each other in a design, is equal to a distance $\Delta W_2$ between the other of the first marks 16 and the other of the second marks 26, which overlap with each other in a design. For example, the first and second distances $\Delta W_1$ and $\Delta W_2$ are measured, and then the first and second electronic components 10 and 20 are so moved that both the first and second distances $\Delta W_1$ and $\Delta W_2$ become:

$(\Delta W_1 + \Delta W_2)/2$.

The Calculation in this Step may be also Performed by the Computer.

Next, a distance between the first and second points $P_1$ and $P_2$ (e.g. an approximated distance $\Delta Y$) is computed. For example, a difference $\Delta W$ between a distance $W_1$ equivalent to an approximate value of the distance W' at the time of positioning between the pair of terminals selected among the first group of terminals 12 and used as a reference terminal pair for the distance W, and a distance $W_2$ equivalent to an approximate value of the distance W" at the time of positioning between the pair of terminals selected among the second group of terminals 22 and used as a reference terminal pair for the distance W is computed. Incidentally, the difference $\Delta W$ may be computed from a difference between the distances $W_1$ and $W_2$. Alternatively, the difference $\Delta W$ may be computed by the following equation:

$\Delta W = \Delta W_1 + \Delta W_2$.

Then, an approximated distance $\Delta Y$ between the first and second points may be computed by the following equation:

$\Delta Y = (D/W) \times \Delta W$.

The Calculation in this Step may be also Performed by the Computer.

The approximated distance $\Delta Y$ may be computed every time the positioning is conducted, whereas it may be previously obtained (e.g. it may be recorded on a memory unit) and read out when conducting the positioning.

Figure 4A:
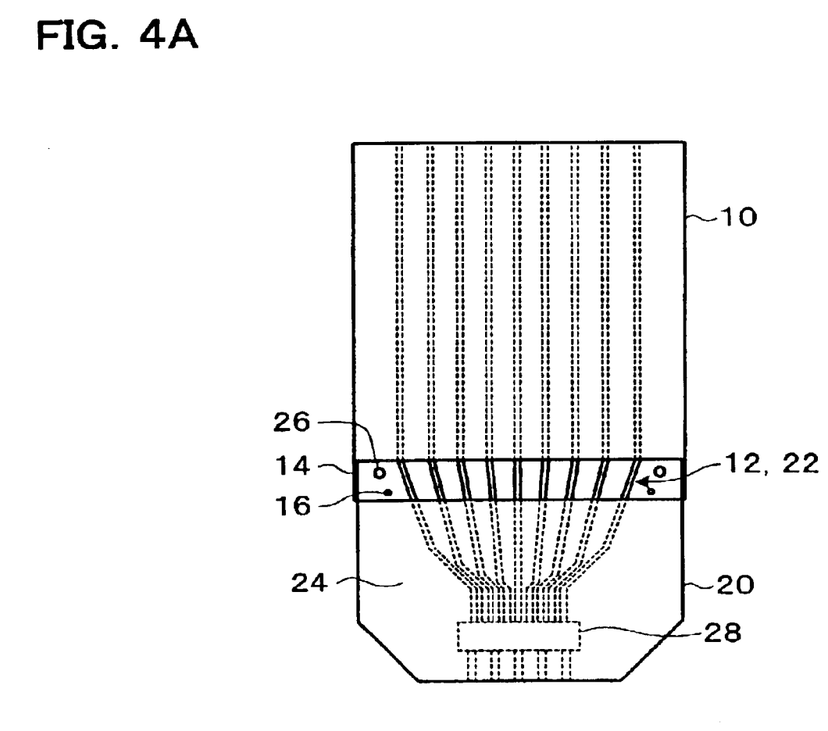
FIGS. 4A and 4B illustrate the method of manufacturing an electronic device according to the first embodiment of the present invention.
Figure 4B:
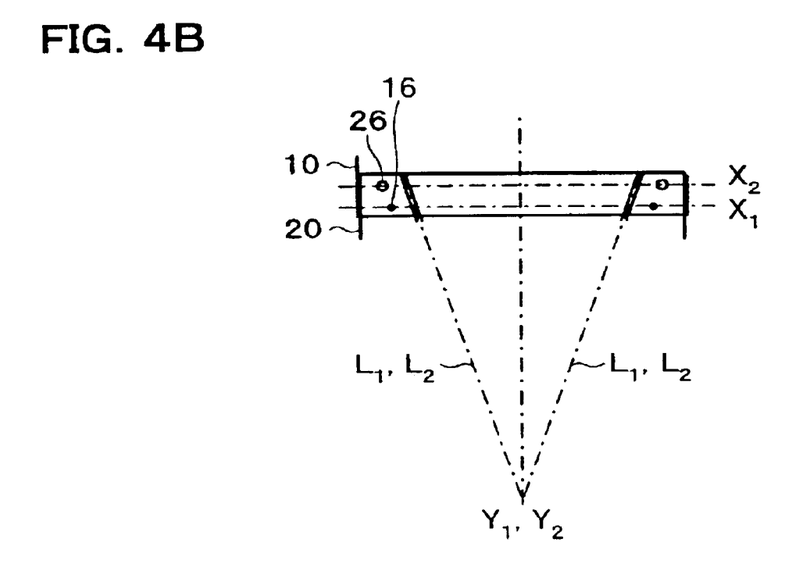

Then, as shown in FIGS. 4A and 4B, the first and second electronic components 10 and 20 are made to move in the directions that the first and second points $P_1$ and $P_2$ approach each other along the first and second Y axes $Y_1$ and $Y_2$ by a distance between the first and second points $P_1$ and $P_2$ (an approximated distance $\Delta Y$ in this embodiment). Thus, when making the first and second points $P_1$ and $P_2$ coincide, a part of each of the first group of terminals 12 overlaps with a part of corresponding one of the second group of terminals 22. In other words, it becomes possible to conduct the positioning of the first and second groups of terminals 12 and 22. Consequently, the first and second groups of terminals 12 and 22 are electrically connected. For such electrical connection, an anisotropic conductive film or anisotropic conductive paste may be used, and further metal bonding or compression bonding by an insulating adhesive may be applied.

The foregoing steps make it possible to electrically connect the first and second electronic components 10 and 20, and thus a resulting electronic device can be provided.

According to the embodiment, even when expansion or contraction of the first or second electronic component 10 and 20 makes it impossible to conduct the positioning of the first and second groups of terminals 12 and 22 following the design thereof, they can be positioned through simple operations using the first and second marks 16 and 26. All of the positionings according to this embodiment may be conducted under automatic control.

Second Embodiment

Figure 5A:
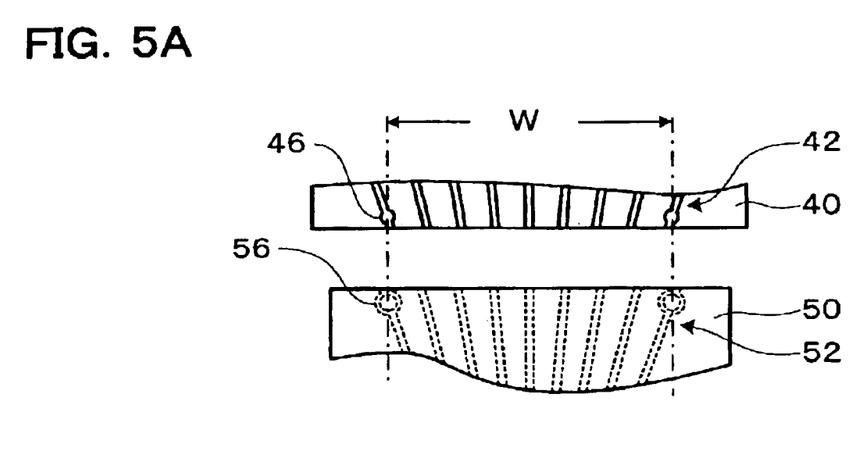
FIGS. 5A and 5B illustrate a method of manufacturing an electronic device according to a second embodiment of the present invention.
Figure 5B:
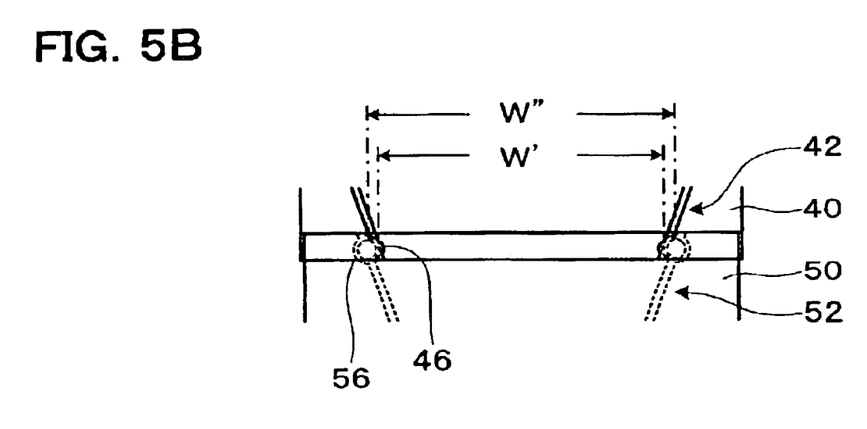

FIGS. 5A and 5B illustrate a method of manufacturing an electronic device according to the second embodiment of the present invention. More specifically, FIG. 5A illustrates the first and second groups of terminals and the first and second marks in the design stage; FIG. 5B illustrates the first and second groups of terminals and the first and second marks in the positioning stage.

In a first electronic component 40 in this embodiment, each mark of a pair of first marks 46 is a part of each of a pair of terminals selected among a first group of terminals 42 and used as a reference terminal pair for the distance W. In other words, the first marks 46 are located on any terminals of the first group of terminals 42. Further, in a second electronic component 50, each mark of a pair of second marks 56 is a part of each of a pair of terminals selected among a second group of terminals 52 and used as a reference terminal pair for the distance W. That is, the second marks 56 are located on any terminals of the second group of terminals 52. The construction other than the foregoing follows the description for the first embodiment.

In the first embodiment, the difference $\Delta W$ is computed from the distances $W_1$ and $W_2$, or the first and second distances $\Delta W_1$ and $\Delta W_2$. On the other hand, in this embodiment, the difference to be computed $\Delta W$ is a difference between the distances W' and W". Therefore, the approximated distance $\Delta Y$ approaches an actual distance between the first and second points $P_1$ and $P_2$. The advantages other than the foregoing are the same as those in the description for the first embodiment.

Figure 6:
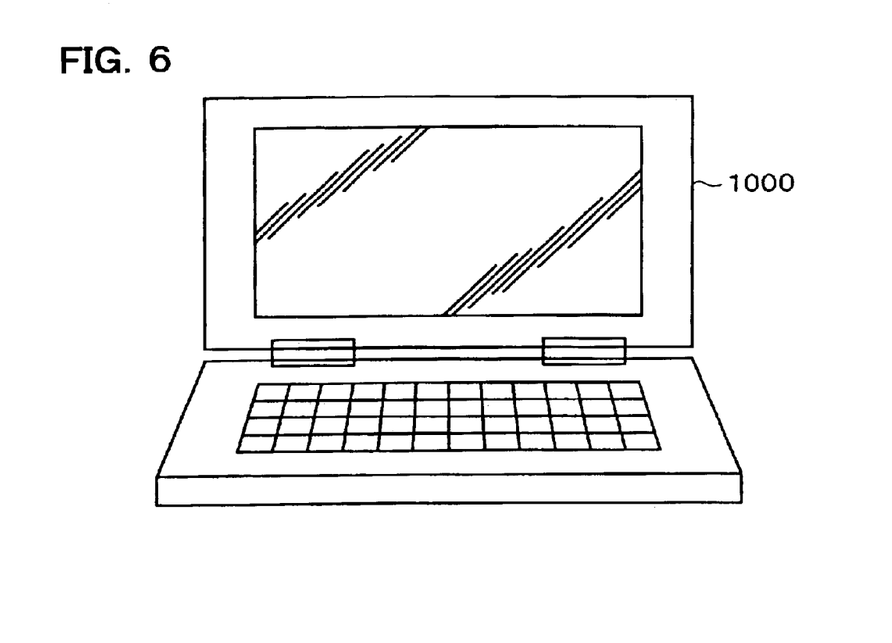
FIG. 6 shows an example of an electronic instrument according to an embodiment of the present invention.
Figure 7:
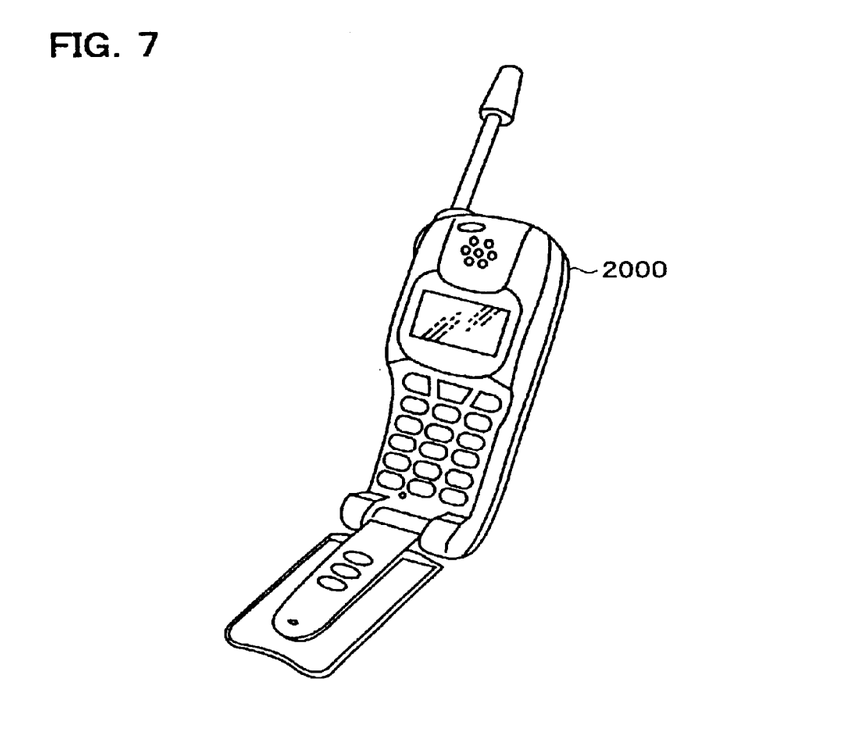
FIG. 7 shows an example of an electronic instrument according to an embodiment of the present invention.

As an electronic instrument having an electronic device described above, FIG. 6 shows a notebook-sized personal computer 1000 and FIG. 7 shows a portable telephone 2000.

The present invention is not limited to the above embodiments and various modifications thereof may be made. Among others, the present invention may include substantially the same constituent features as those described in the above embodiments, for example, in function, method, and result, or in object and result. Also, the present invention may include a constituent feature resulting from the replacement of a nonessential part of the constituent feature described in the embodiments. The present invention may further include a constituent feature capable of providing the same effects and advantages, or achieving the same objects as that described in the embodiments. Moreover, the present invention may include a constituent feature, which is composed of the constituent feature described in the embodiments and the known art.

What is claimed is:

1. A method of manufacturing an electronic device comprising step of positioning a first group of terminals including three or more terminals formed in a first electronic component and a second group of terminals including three or more terminals formed in a second electronic component so as to overlap each other and electrically connecting the first and second groups of terminals, the first electronic component having a pair of first marks, and the second electronic component having a pair of second marks, wherein (a) in a design stage:

each of terminals in the first group of terminals is designed to extend along one of a plurality of first lines passing through a first point;

terminals in the first group of terminals are arranged line symmetrically with respect to a first Y axis passing through the first point;

each of terminals in the second group of terminals is designed to extend along one of a plurality of second lines passing through a second point;

terminals in the second group of terminals are arranged line symmetrically with respect to a second Y axis passing through the second point;

the first lines and the second lines are designed to be arranged in the same manner;

the pair of first marks are designed to be located on a first X axis which is orthogonal to the first Y axis and intersects with the first group of terminals;

the pair of second marks are designed to be located on a second X axis which is orthogonal to the second Y axis and intersects with the second group of terminals; and the pair of first marks are designed to coincide with the pair of second marks, respectively, when the first and second groups of terminals overlap each other, and wherein (b) the step of positioning the first and second groups of terminals comprises steps of:

disposing the first and second electronic components so that the first and second X axes coincide with each other and the first and second Y axes coincide with each other; and moving the first and second electronic components respectively, in directions in which the first and second points approach each other and along the first and second Y axes, by an approximated distance between the first and second points.

2. The method of manufacturing an electronic device as defined by claim 1, wherein the pair of first marks are disposed at positions line symmetrical with respect to the first Y axis, wherein the pair of second marks are disposed at positions line symmetrical with respect to the second Y axis, and wherein the step of disposing the first and second electronic components so that the first and second Y axes coincide with each other includes moving the first and second electronic components so that a first distance and a second distance become equal to each other, the first distance being a distance between one of the first marks and one of the second marks overlapping each other in a design, and the second distance being a distance between the other of the first marks and the other of the second marks overlapping in a design.

3. The method of manufacturing an electronic device as defined by claim 2, wherein the step of disposing the first and second electronic components so that the first and second Y axes coincide with each other comprises:

measuring the first distance $\Delta W_1$;

measuring the second distance $\Delta W_2$; and moving the first and second electronic components so that the first and second distances $\Delta W_1$ and $\Delta W_2$ become:

$$(\Delta W_1+W_2)/2.$$

4. The method of manufacturing an electronic device as defined by claim 1, further comprising:

obtaining a ratio D/W of a distance D prior to the step of positioning the first and second groups of terminals, the distance D being a distance between an intersecting point of the first X and Y axes in a design and the first point with respect to a distance W between a pair of terminals disposed line symmetrically among the first group of terminals in a design, wherein the distance W is also a distance between a pair of terminals disposed line symmetrically among the second group of terminals in a design, wherein the ratio D/W is also a ratio of a distance D between an intersecting point of the second X and Y axes in a design and the second point to the distance W, wherein a difference $\Delta W$ between a distance W' or a distance $W_1$, and a distance W" or a distance $W_2$ is computed, the distance W' being a distance at a time of positioning the pair of terminals selected among the first group of terminals and used as a reference for the distance W, the distance $W_1$ being an approximate value of the distance W', the distance W" being a distance at a time of positioning the pair of terminals selected among the second group of terminals and used as a reference for the distance W, and the distance $W_2$ being an approximate value of the distance W", and wherein an approximated distance $\Delta Y$ between the first and second points is computed by using the following equation:

$$\Delta Y=(D/W)\times\Delta W.$$

5. The method of manufacturing an electronic device as defined by claim 3, further comprising:

obtaining a ratio D/W of a distance D prior to the step of positioning the first and second groups of terminals, the distance D being a distance between an intersecting point of the first X and Y axes in a design and the first point with respect to a distance W between a pair of terminals disposed line symmetrically among the first group of terminals in a design, wherein the distance W is also a distance between a pair of terminals disposed line symmetrically among the second group of terminals in a design, wherein the ratio D/W is also a ratio of a distance D between an intersecting point of the second X and Y axes in a design and the second point to the distance W, wherein a difference $\Delta W$ between a distance W' or a distance $W_1$, and a distance W" or a distance $W_2$ is computed, the distance W' being a distance at a time of positioning the pair of terminals selected among the first group of terminals and used as a reference for the distance W, the distance $W_1$ being an approximate value of the distance W', the distance W" being a distance at a time of positioning the pair of terminals selected among the second group of terminals and used as a reference for the distance W, and the distance $W_2$ being an approximate value of the distance W", and wherein an approximated distance $\Delta Y$ between the first and second points is computed by using the following equation:

$$\Delta Y=(D/W)\times\Delta W.$$

6. The method of manufacturing an electronic device as defined by claim 4, wherein the difference $\Delta W$ to be computed is a difference between the distance $W_1$ and the distance $W_2$, wherein the distance $W_1$ is a distance between the pair of first marks, and wherein the distance $W_2$ is a distance between the pair of second marks.

7. The method of manufacturing an electronic device as defined by claim 5, wherein the difference $\Delta W$ to be computed is a difference between the distance $W_1$ and the distance $W_2$, wherein the distance $W_1$ is a distance between the pair of first marks, and wherein the distance $W_2$ is a distance between the pair of second marks.

8. The method of manufacturing an electronic device as defined by claim 7, wherein the difference $\Delta W$ is computed by using the following equation:

$$\Delta W=\Delta W_{1+\Delta W2}.$$

9. The method of manufacturing an electronic device as defined by claim 6, wherein the pair of first marks are disposed at positions closer to the pair of terminals, which are selected among the first group of terminals as a reference for the distance W, than the remaining terminals, and wherein the pair of second marks are disposed at positions closer to the pair of terminals, which are selected among the second group of terminals as a reference for the distance W, than the remaining terminals.

10. The method of manufacturing an electronic device as defined by claim 8, wherein the pair of first marks are disposed at positions closer to the pair of terminals, which are selected among the first group of terminals as a reference for the distance W, than the remaining terminals, and wherein the pair of second marks are disposed at positions closer to the pair of terminals, which are selected among the second group of terminals as a reference for the distance W, than the remaining terminals.

11. The method of manufacturing an electronic device as defined by claim 4, wherein the pair of first marks are disposed in an end portion of the first electronic component, and wherein the pair of second marks are disposed in an end portion of the second electronic component.

12. The method of manufacturing an electronic device as defined by claim 4, wherein the difference $\Delta W$ to be computed is a difference between the distance W' and the distance W", wherein each of the pair of first marks is a part of each of the pair of terminals selected among the first group of terminals and used as a reference for the distance W, and wherein each of the pair of second marks is a part of each of the pair of terminals selected among the second group of terminals and used as a reference for the distance W.

13. The method of manufacturing an electronic device as defined by claim 4, wherein a pair of terminals selected among the first group of terminals and located at opposed ends along an arrangement direction of the first group of terminals are used as a reference for the distance W, and wherein a pair of terminals selected among the second group of terminals and located at opposed ends along an arrangement direction of the second group of terminals are used as a reference for the distance W.

14. The method of manufacturing an electronic device as defined by claim 4, wherein the distance W in a design of the first group of terminals is substantially equal to the distance W' at a time of positioning, and wherein the distance D between the intersecting point of the first X and Y axes and the first point of the first group of terminals in a design is substantially equal to a distance D' between an intersecting point of the first X and Y axes and the first point at a time of positioning, and following relations are considered to compute the difference $\Delta W$:

$W'=W$, and $D'=D$.

15. The method of manufacturing an electronic device as defined by claim 4, wherein the approximated distance $\Delta Y$ between the first and second points is previously obtained prior to the step of positioning the first and second groups of terminals, and wherein the approximated distance $\Delta Y$ between the first and second points is read out and used in the step of positioning the first and second groups of terminals.

16. The method of manufacturing an electronic device as defined by claim 1, wherein the first marks are formed of the same material as the first group of terminals, and wherein the second marks are formed of the same material as the second group of terminals.

17. The method of manufacturing an electronic device as defined by claim 1, wherein positioning of the first and second electronic components is conducted by an automatic control.

18. The method of manufacturing an electronic device as defined by claim 17, wherein the automatic control is performed by image recognition by a camera and calculation by a computer.

* * * * *